(12) United States Patent
Tamura et al.

(10) Patent No.: US 7,258,950 B2
(45) Date of Patent: *Aug. 21, 2007

(54) ELECTRODE FOR RECHARGEABLE LITHIUM BATTERY AND RECHARGEABLE LITHIUM BATTERY

(75) Inventors: Noriyuki Tamura, Kobe (JP); Shiori Nakamizo, Amagasaki (JP); Daizo Jito, Kobe (JP); Ryuji Ohshita, Tokushima (JP); Masahisa Fujimoto, Osaka (JP); Shin Fujitani, Kobe (JP); Maruo Kamino, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 274 days.

This patent is subject to a terminal disclaimer.

(21) Appl. No.: 10/380,801

(22) PCT Filed: Sep. 19, 2001

(86) PCT No.: PCT/JP01/08129

§ 371 (c)(1),
(2), (4) Date: Mar. 19, 2003

(87) PCT Pub. No.: WO02/25757

PCT Pub. Date: Mar. 28, 2002

(65) Prior Publication Data

US 2003/0180619 A1    Sep. 25, 2003

(30) Foreign Application Priority Data

Sep. 20, 2000  (JP) ............................. 2000-285343
Apr. 11, 2001  (JP) ............................. 2001-113069

(51) Int. Cl.
    H01M 4/72    (2006.01)
    H01M 4/58    (2006.01)

(52) U.S. Cl. ................ 429/233; 429/231.95; 429/241; 429/209

(58) Field of Classification Search ................ 429/233, 429/236, 245, 241, 231.95, 218.1, 209, 137; 204/280, 290.01, 293; 427/126.1, 126.4, 427/126.6; 428/548, 615, 618, 650, 674; 420/557, 560
See application file for complete search history.

(56) References Cited

U.S. PATENT DOCUMENTS

| | | | |
|---|---|---|---|
| 4,440,837 A * | 4/1984 | Shimotake et al. ......... | 429/112 |
| 5,445,908 A * | 8/1995 | Inoue et al. ................ | 429/229 |
| 5,582,935 A * | 12/1996 | Dasgupta et al. ......... | 429/218.1 |
| 6,746,801 B2 * | 6/2004 | Tamura et al. .............. | 429/245 |
| 2003/0088971 A1 * | 5/2003 | Visco et al. ............... | 29/623.1 |

FOREIGN PATENT DOCUMENTS

| | | |
|---|---|---|
| JP | 63-13264 | 1/1988 |
| JP | 6-260168 A | 9/1994 |
| JP | 8-50922 A | 2/1996 |
| JP | 8-78011 A | 3/1996 |
| JP | 8-255610 A | 10/1996 |
| JP | 10-162823 A | 6/1998 |
| JP | 10-223221 A | 8/1998 |
| JP | 11-214010 A | 8/1999 |
| JP | 11-233116 A | 8/1999 |
| JP | 11-242954 A | 9/1999 |
| JP | 11-273683 A | 10/1999 |
| JP | 2000-133261 A | 5/2000 |
| JP | 2000-200610 A | 7/2000 |
| JP | 2001-006667 A | 1/2001 |
| JP | 2001-068112 A | 3/2001 |
| JP | 2001-256967 | 9/2001 |
| JP | 2001-256968 A | 9/2001 |
| JP | 2002-198091 | 7/2002 |
| JP | 2002-260650 A | 9/2002 |
| JP | 2002-367602 A | 12/2002 |
| JP | 2003-36840 | 2/2003 |
| WO | 99/49532 A1 | 9/1999 |

OTHER PUBLICATIONS

Winter, Martin, et al.; "Electrochemical lithiation of tin and tin-based intermetallics and composites"; *Electrochimica Acta 45*, pp. 31-50; 1999.

* cited by examiner

Primary Examiner—Raymond Alejandro
(74) Attorney, Agent, or Firm—Kubovcik & Kubovcik (57) ABSTRACT

An electrode having a current collector and, formed thereon, a thin film comprising an active material, characterized in that a thin alloy film (such as Sn—Co) comprising a metal which can form an alloy with lithium (such as Sn) and a metal which can not form an alloy with lithium (such as Co) is formed on a current collector such as a copper foil. It is preferred that the above metal which can form an alloy with lithium and the above metal which can not form an alloy with lithium can not form an intermetallic compound with each other.

12 Claims, 4 Drawing Sheets

ELECTRODE FOR RECHARGEABLE LITHIUM BATTERY AND RECHARGEABLE LITHIUM BATTERY

TECHNICAL FIELD

The present invention relates to a novel electrode for a rechargeable lithium battery and also to a rechargeable lithium battery utilizing the same.

BACKGROUND ART

Rechargeable lithium batteries, recently under extensive development and research, exhibit battery characteristics, such as charge-discharge voltage, charge-discharge cycle life characteristics and storage characteristics, which depend largely upon the types of the electrodes used. This has led to the various attempts to better battery characteristics by improving active electrode materials.

The use of metallic lithium as the negative active material enables construction of batteries which exhibit high energy densities, both gravimetric and volumetric. However, the lithium deposited on charge grows into dendrites, which could cause problematic internal short-circuiting.

On the other hand, rechargeable lithium batteries are reported using an electrode composed of aluminum, silicon, tin or the like which alloys electrochemically with lithium during charge (Solid State Ionics, 113–115, p57 (1998)).

However, such lithium-alloying materials when used as the negative electrode material undergo large volumetric expansion and shrinkage as they store and release lithium. The subsequent pulverization and separation thereof from the current collector makes it difficult to obtain satisfactory charge-discharge cycle characteristics, which has been a problem.

DISCLOSURE OF THE INVENTION

It is an object of the present invention to provide an electrode for a rechargeable lithium battery, which exhibits a high discharge capacity and superior charge-discharge characteristics, as well as providing a rechargeable lithium battery using the same.

The electrode for a rechargeable lithium battery, in accordance with the present invention, is characterized as comprising a current collector and an alloy thin film provided on the current collector and composed of a metal that alloys with lithium and a metal that does not alloy with lithium.

In the present invention, the metal that alloys with lithium refers to a metal which forms an alloy, such as a solid solution or intermetallic compound, with lithium. Specific examples of such lithium-alloying metals include Sn, Ge, Al, In, Mg, Si and the like.

In the present invention, the metal that does not alloy with lithium refers to a metal which does not form an alloy, such as a solid solution or intermetallic compound, with lithium and more specifically to a metal which does not show the presence of an alloy state in its binary phase diagram with lithium. Examples of such nonlithium-alloying metals include Cu, Fe, Ni, Co, Mo, W, Ta, Mn and the like.

In the present invention, the nonlithium-alloying metal is preferably of the type that forms an intermetallic compound with the lithium-alloying metal. The intermetallic compound, as used herein, refers to a compound which has a specific crystal structure containing metals in a specific proportion. In the present invention, if the lithium-alloying metal is Sn, the nonlithium-alloying metal is preferably of the type that forms an intermetallic compound with Sn. Such a nonlithium-alloying metal may contain at least one metal selected from Ti, Mn, Fe, Ni, Co, Cu, Zr and Mo. One or more of these metals may be contained. Preferred among those metals is at least one selected from Fe, Co and Ni. Particularly preferred is Co. In the present invention, the thin alloy film composed of such metals does not necessarily contain an intermetallic compound thereof. The thin alloy film is not necessarily crystalline and may be amorphous or comprise a nonstoichiometric compound.

In the present invention, the thin alloy film composed of the lithium-alloying metal and the nonlithium-alloying metal is provided on the current collector. Although not limiting, formation of the thin alloy film is preferably achieved by an electrochemical process such as electrolytic plating and electroless plating. Physical thin film-forming processes, such as CVD, sputtering, vapor evaporation and thermal spraying, can also be utilized to form the thin alloy film.

The current collector for use in the present invention is not particularly specified, so long as it is applicable for use in an electrode for a rechargeable lithium battery. The current collector may comprise a metal foil composed of copper, nickel, titanium, iron, stainless steel, molybdenum, cobalt, chromium, tungsten, tantalum, silver or the like, for example.

Preferably, the current collector for use in the present invention has irregularities on its surface. An upper limit of surface roughness Ra of the current collector is not particularly specified. However, in general, a copper foil having a practical thickness for batteries and a surface roughness Ra of exceeding 2 μm is not readily available in the market. Under such circumstances, the upper limit of surface roughness Ra is preferably 2 μm or below, more preferably 1 μm or below. On the other hand, a lower limit of surface roughness Ra is preferably 0.01 μm or above. Accordingly, the surface roughness Ra is preferably in the range of 0.01–2 μm, more preferably in the range of 0.01–1 μm.

The surface roughness Ra is defined in Japan Industrial Standards (JIS B 0601-1994) and can be determined as by a surface roughness meter. When a copper foil having a large surface roughness Ra is desired for a current collector, the use of an electrolytic copper foil is preferred.

In the present invention, it is preferred that the thin alloy film is separated into islands by gaps or spaces formed therein in a manner to extend in its thickness direction. If the thin alloy film is separated into islands while it remains adherent to the current collector, a marked improvement of charge-discharge cycle characteristics results.

Because of inclusion of the lithium-alloying metal, the thin alloy film can store lithium via alloying therewith during a charge-discharge reaction. For example, in the case where the electrode of the present invention is used as a negative electrode, the thin alloy film stores lithium during charge and releases lithium during discharge. As the thin alloy film stores and releases lithium in such a fashion, it expands and shrinks in volume. The separation of the thin alloy film into islands results in the provision of spaces that surround the islands. These surrounding spaces can accommodate changes in volume of the thin alloy film as it expands and shrinks during charge-discharge cycles. Accordingly, no strain is produced in the thin alloy film. This prevents pulverization and separation thereof from the current collector.

The plating or physical thin film-forming process involves depositing, in the form of a continuous thin film, an alloy onto the current collector. If this is the case, the first or subsequent charge-discharge reaction causes formation of the gaps which extend in the thickness direction of the thin alloy film. When the thin alloy film expands and subsequently shrinks in the charge-discharge reaction, such gaps are formed along the thickness direction to separate the thin alloy film into islands. Such separation of the thin alloy film along the gaps extending in its thickness direction is facilitated particularly when the current collector having surface irregularities is used. Deposition of the thin alloy film on the current collector having surface irregularities results in the formation of the corresponding surface irregularities on a surface of the deposited thin alloy film. It is believed that when such a thin alloy film expands and shrinks, gaps are formed along lines which extend between respective valleys of the irregularities on the thin alloy film surface and on the current collector surface, so that the thin alloy film is separated into islands along the valleys of the irregularities on the current collector surface.

In the present invention, the thin alloy film preferably contains up to 50% of the nonlithium-alloying metal, based on a molar ratio (atomic ratio). If the content exceeds this range, the relative amount of the lithium-alloying metal becomes small to result in the undesirable reduction of a charge-discharge capacity. It is also preferred that the thin alloy film contains at least 0.1% of the nonlithium-alloying metal, based on a molar ratio (atomic ratio). Inclusion of nonlithium-alloying metal reduces volumetric expansion and shrinkage of the thin alloy film during a charge-discharge reaction to result in the improved charge-discharge cycle characteristics. In view of this cycle characteristic improvement, it is preferred that the thin alloy film contains at least 0.1% of the nonlithium-alloying metal. Hence, the nonlithium-alloying metal is preferably incorporated in the thin alloy film within the range of 0.1–50%, based on a molar ratio (weight ratio), more preferably 1–40%, based on a molar ratio (atomic ratio).

In the present invention, a mixed layer of components of the current collector and the alloy may be formed at an interface between the current collector and the thin alloy film. Formation of such a mixed layer assures better adhesion of the thin alloy film to the current collector, so that further improvement of cycle characteristics can be expected. This mixed layer can be formed, for example, by depositing the thin alloy film on the current collector and then subjecting the deposited thin alloy film to a heat treatment or the like. Preferably, the heat treatment is carried out at a temperature lower than the respective melting points of the thin alloy film and the current collector.

The rechargeable lithium battery of the present invention is characterized as including a negative electrode comprised of the electrode of the present invention for a rechargeable lithium battery, a positive electrode and a nonaqueous electrolyte.

An electrolyte solvent for use in the rechargeable lithium battery of the present invention is not particularly specified in type but can be illustrated by a mixed solvent which contains cyclic carbonate such as ethylene carbonate, propylene carbonate, butylene carbonate or vinylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane. Examples of electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and mixtures thereof. Illustrative of other applicable electrolytes are gelled polymer electrolytes comprised of an electrolyte solution impregnated into polymer electrolytes such as polyethylene oxide and polyacrylonitrile, and inorganic solid electrolytes such as LiI and $Li_3N$, for example. The electrolyte for the rechargeable lithium battery of the present invention can be used without limitation, so long as an Li compound as its solute that imparts an ionic conductivity, together with its solvent that dissolves and retains the Li compound, remain undecomposed at voltages during charge, discharge and storage of the battery.

Examples of useful active materials of the positive electrode for the rechargeable lithium battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; and lithium-free metal oxides such as $MnO_2$. Other substances can also be used, without limitation, if they are capable of electrochemical lithium insertion and deinsertion.

BEST MODE FOR CARRYING OUT THE INVENTION

The present invention is below described in more detail by way of Examples. It will be recognized that the following examples merely illustrate the practice of the present invention but are not intended to be limiting thereof. Suitable changes and modifications can be effected without departing from the scope of the present invention.

EXPERIMENT 1

(Fabrication of Electrodes)

An electrolytic plating technique was utilized to deposit, in the form of a thin film having a thickness of 2 μm, an Sn—Co alloy on an electrolytic copper foil (surface roughness Ra=0.188 μm). A plating bath was used containing a mixture of tin chloride, cobalt chloride, sodium chloride, hydrochloric acid, ethylene glycol and thiourea.

After deposition of the Sn—Co alloy thin film, the stack was cut into a size of 2 cm×2 cm to provide an electrode a1.

For a comparative purpose, a slurry was prepared containing a mixture of an Sn—Co alloy powder (molar ratio of 8:2) produced via atomization and a fluoro resin (PVdF) at a 95:5 ratio by weight, the slurry was coated onto an electrolytic copper foil and then dried, and the resulting stack was cut into a size of 2 cm×2 cm to provide an electrode b1.

(Preparation of Electrolyte Solution)

1 mole/liter of $LiPF_6$ was dissolved in a mixed solvent containing ethylene carbonate and diethyl carbonate at a 1:1 ratio by volume to prepare an electrolyte solution.

(Construction of Beaker Cell)

Figure 3:
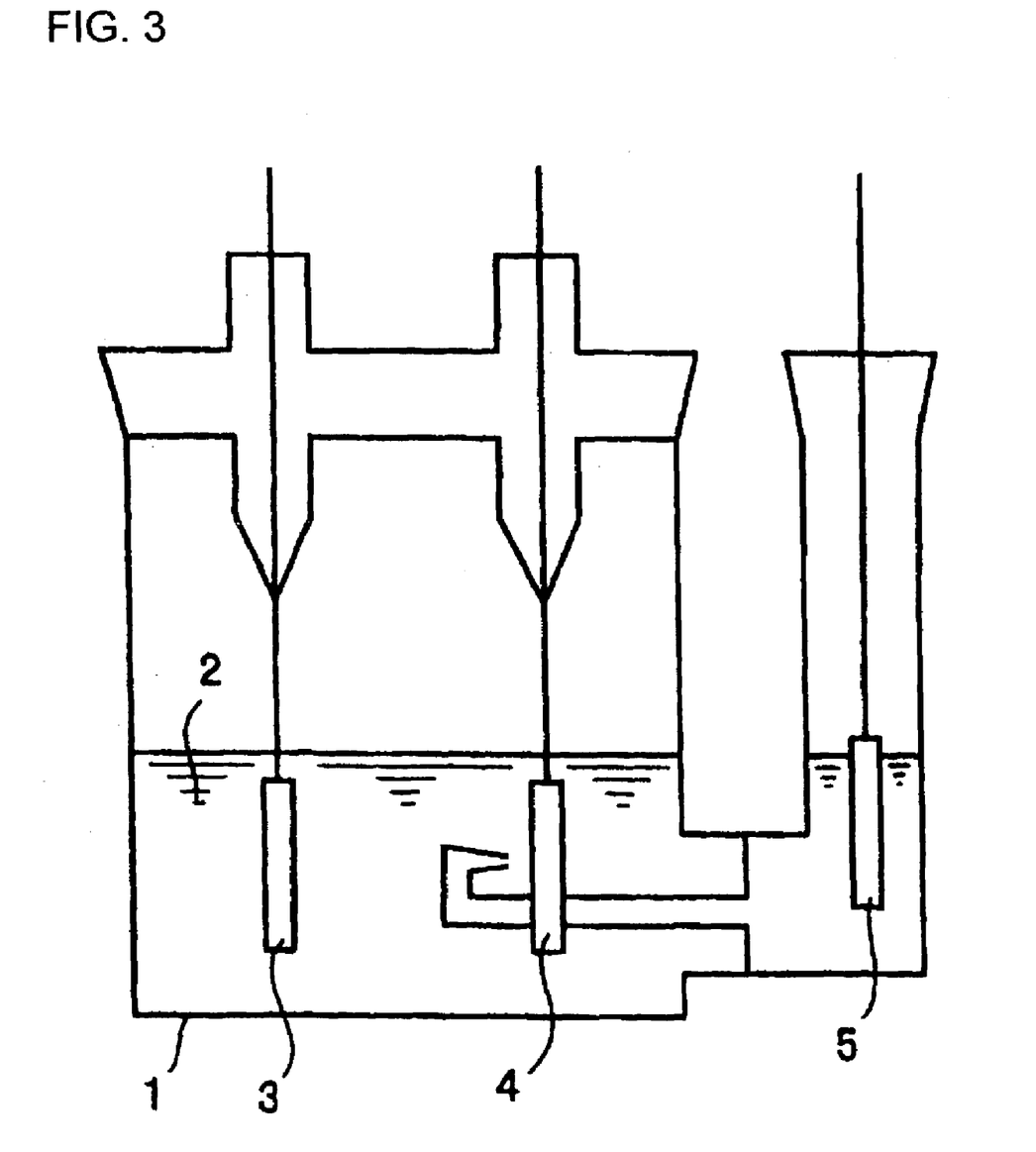
FIG. 3 is a schematic sectional view, showing a beaker cell constructed in one example.

Using each of the above-fabricated electrodes a1 and b1 as a working electrode, a beaker cell shown in FIG. 3 was constructed. As shown in FIG. 3, the beaker cell includes a counter electrode 3, a working electrode 4 and a reference electrode 5, which are all immersed in an electrolyte solution contained in a container 1. The above-prepared electrolyte solution was used as the electrolyte solution 2. Metallic lithium was used for both the counter electrode 3 and the reference electrode 5.

(Measurement of Charge-Discharge Characteristics)

The above-constructed beaker cell was charged at 25° C. at a constant current of 0.2 mA to 0 V (vs. Li/Li$^+$) and then discharged at a constant current of 0.2 mA to 2 V (vs. Li/Li$^+$). This unit cycle of charge and discharge was repeated 10 times to measure a charge capacity and a discharge capacity per gram of active material on each cycle and then calculate an initial efficiency and a capacity retention rate as each defined below. The results are given in Table 1. In this beaker cell, reduction of the working electrode takes place during charge and oxidation thereof takes place during discharge.

Initial efficiency (%)=(1st-cycle discharge capacity/ 1st-cycle charge capacity)×100

Capacity retention rate (%)=(10th-cycle discharge capacity/1st-cycle discharge capacity)×100

TABLE 1

| Electrode | 1st-Cycle Charge Capacity (mAh/g) | 1st-Cycle Discharge Capacity (mAh/g) | Initial Efficiency (%) | 10th-Cycle Discharge Capacity (mAh/g) | Capacity Retention Rate (%) |
|---|---|---|---|---|---|
| a1 | 772 | 632 | 82 | 628 | 99 |
| b1 | 403 | 309 | 77 | 3 | 1 |

As apparent from the results shown in Table 1, the electrode a1 in accordance with the present invention has the increased discharge capacity and exhibits the improved cycle characteristics compared to the comparative electrode b1.

EXPERIMENT 2

Rechargeable lithium batteries were constructed using the electrodes a1 and b1 as their respective negative electrodes and then evaluated for charge-discharge cycle characteristics.

(Fabrication of Positive Electrode)

85% by weight of LiCoO$_2$ powder having a mean particle diameter of 10 μm, 10% by weight of carbon powder as an electric conductor and 5% by weight of polyvinylidene fluoride as a binder were mixed together. N-methylpyrrolidone was added to the mixture which was subsequently kneaded to prepare a slurry. This slurry was coated onto one surface of a 20 μm thick aluminum foil using a doctor blade technique and then dried. The resulting stack was cut into a 2 cm×2 cm size to provide a positive electrode.

(Construction of Battery)

The above-fabricated positive electrode and electrode a1 or b1 were bonded to each other with a microporous polyethylene film between them. The resulting combination was inserted into an outer casing made of an aluminum laminated material, and 500 μl of an electrolyte solution similar in type to that prepared in Experiment 1 was further introduced into the outer casing to thereby assemble a rechargeable lithium battery.

Figure 4:
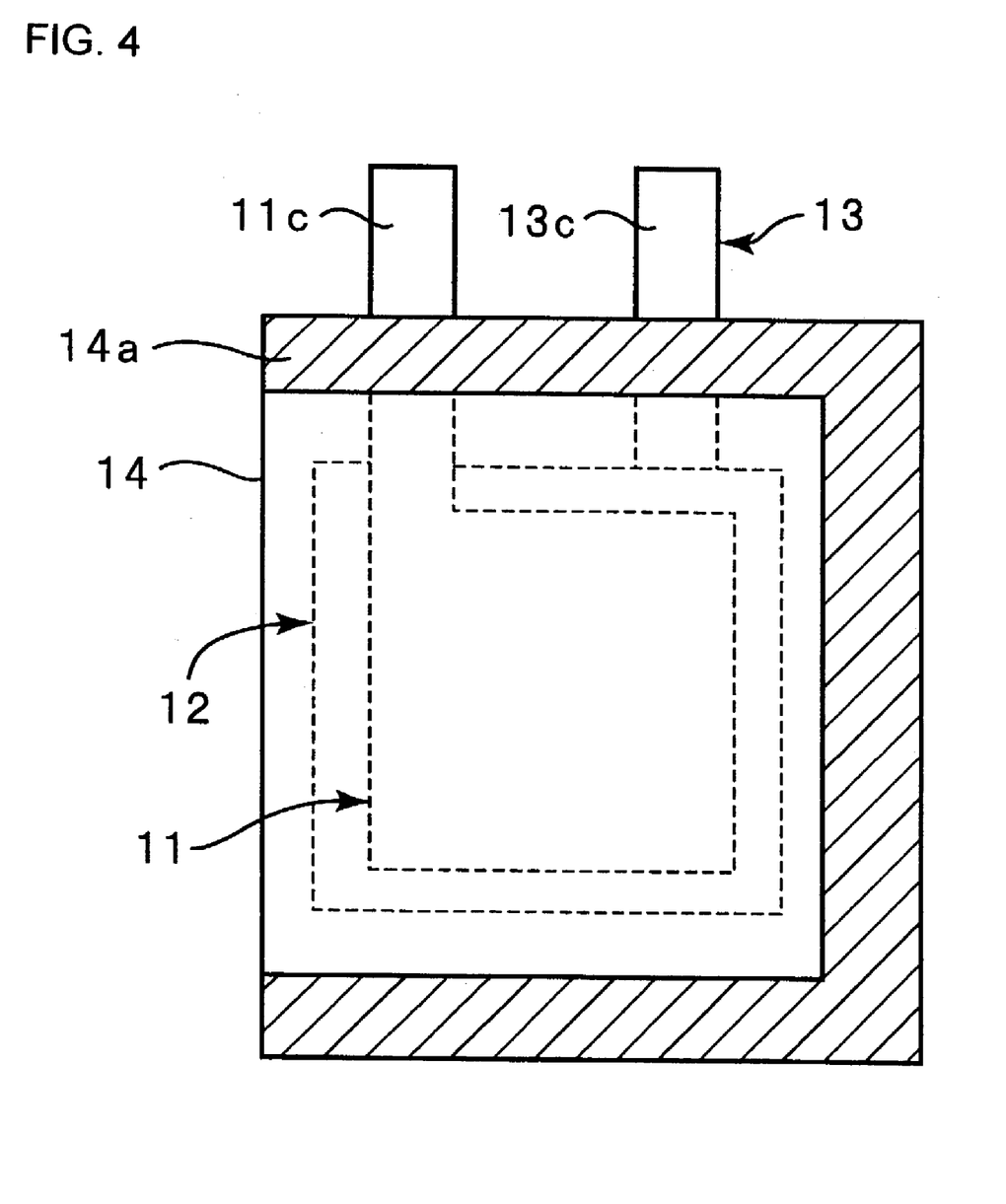
FIG. 4 is a plan view, showing a rechargeable lithium battery constructed in one example.

FIG. 4 is a plan view, showing the rechargeable lithium battery constructed. As shown in FIG. 4, a combination of the positive electrode 11, the negative electrode 13 and the intervening separator 12 comprising a polyethylene microporous film are inserted into the outer casing 14. After insertion of the combination into the outer casing 14, the electrolyte solution is introduced thereinto. A rechargeable lithium battery is constructed by sealing the outer casing 14 at its portion 14a.

Figure 5:
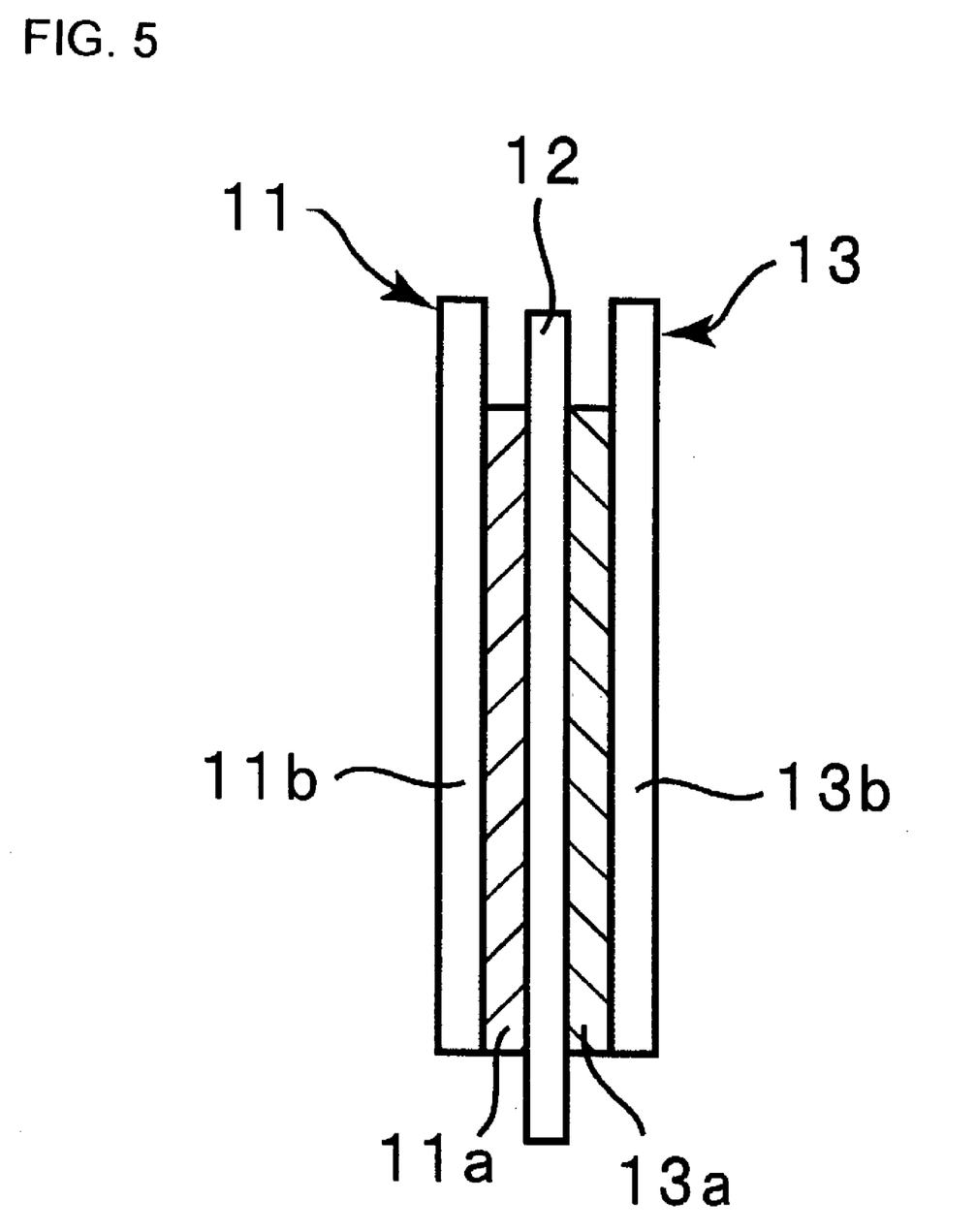
FIG. 5 is a sectional view, showing a combination of electrodes in the rechargeable lithium battery shown in FIG. 4.

FIG. 5 is a sectional view which shows how the electrodes are combined within the battery. As shown in FIG. 5, the positive electrode 11 and the negative electrode 13 are disposed on opposite sides of the separator 12. The positive electrode 11 includes a positive current collector 11b made of aluminum and a layer 11a of positive active material which overlies the positive current collector and contacts with the separator 12. Likewise, the negative electrode 13 includes a negative current collector 13b made of copper and a layer 13a of negative active material which overlies the negative current collector and contacts with the separator 12. In this example, the layer 13a of negative active material comprises an Sn—Co alloy thin film.

As shown in FIG. 4, an externally-extending aluminum positive tab 11c is attached to the positive current collector 11b. Likewise, an externally-extending nickel negative tab 13c is attached to the negative current collector 13b.

The rechargeable lithium batteries constructed using the electrodes a1 and b1 as their respective negative electrodes were designated as a battery A1 and a battery B1. A design capacity of each battery was 6 mAh.

(Charge-Discharge Test)

The above-constructed batteries A1 and B1 were subjected to a charge-discharge test. A unit cycle was designed to consist of a sequence of charging at a constant current of 1.2 mA to a charge capacity of 6 mAh and discharging at a constant current of 1.2 mA to 2.0 V. Exceptionally, the 1st-cycle charge (on the first cycle) was continued to a charge capacity of 7.2 mAh. The procedure of the above Experiment 1 was followed to calculate the initial efficiency and the capacity retention rate for those batteries. The results are given in Table 2. The measurement was carried out at 25° C.

TABLE 2

| Battery | 1st-Cycle Charge Capacity (mAh/g) | 1st-Cycle Discharge Capacity (mAh/g) | Initial Efficiency (%) | 10th-Cycle Discharge Capacity (mAh/g) | Capacity Retention Rate (%) |
|---|---|---|---|---|---|
| A1 | 7.2 | 5.9 | 82 | 4.8 | 81 |
| B1 | 7.2 | 5.5 | 77 | 0.06 | 1 |

As apparent from the results shown in Table 2, the battery A1 in accordance with the present invention exhibits superior charge-discharge cycle performance characteristics.

Figure 1:
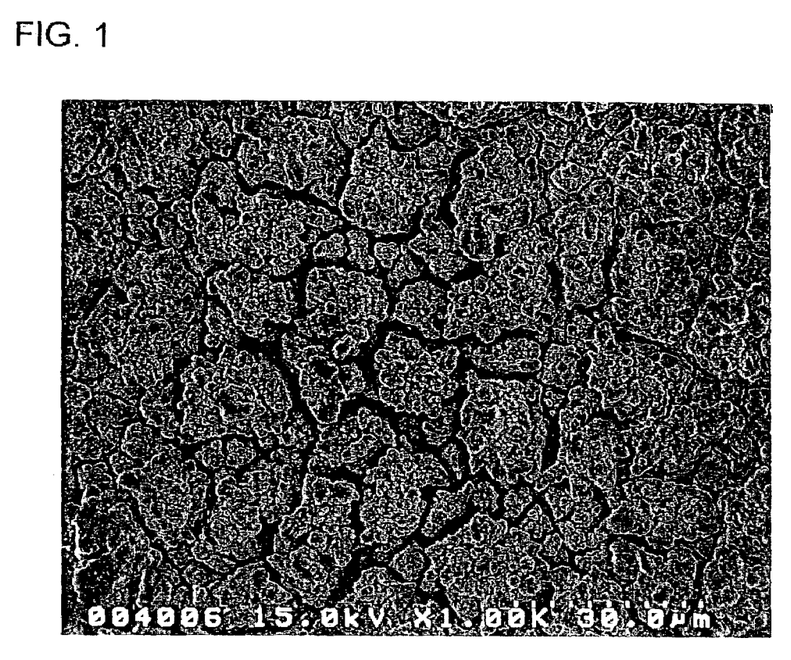
FIG. 1 is a photomicrograph taken using a scanning electron microscope, showing a surface of the electrode a1 in accordance with an embodiment of the present invention.
Figure 2:
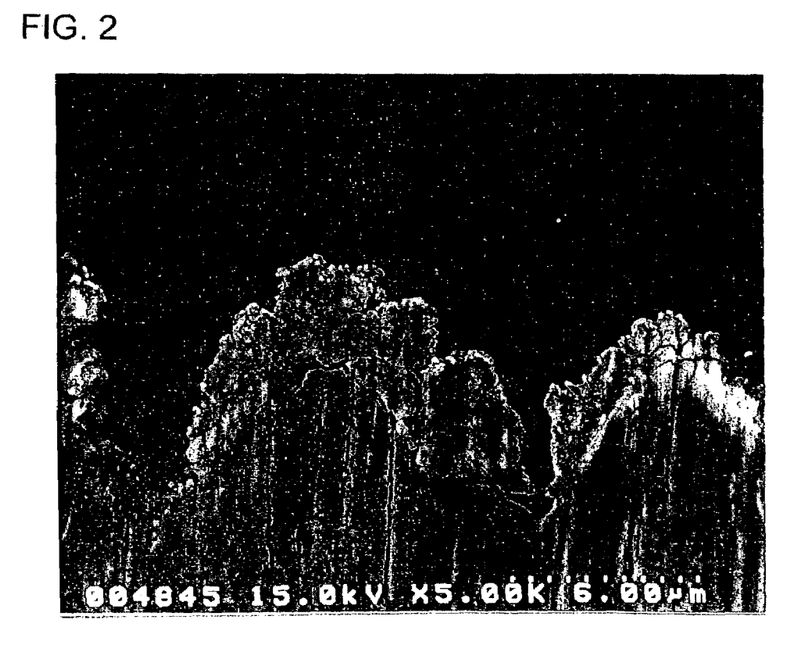
FIG. 2 is a photomicrograph taken using a scanning electron microscope, showing a section of the electrode a1 in accordance with the embodiment of the present invention.

FIG. 1 is a photomicrograph taken using a scanning electron microscope at a magnification of 1,000×, showing a surface of the electrode a1 which was taken out from the battery A1 after 10 cycles in the charge-discharge test. FIG. 2 is a photomicrograph taken using a scanning electron microscope at a magnification of 5,000×, showing a section of the electrode a1 which was embedded in a resin and then sliced. As can be clearly seen from FIGS. 1 and 2, the thin alloy film in the electrode a1 after a charge-discharge reaction is separated into islands by gaps formed therein to extend in its thickness direction. As apparent from FIG. 2, these gaps extend along valleys of irregularities on a surface of the current collector. As also apparent from FIG. 1, these gaps are connected like a network along the valleys of irregularities on the current collector surface, when viewed in a plane of the thin alloy film.

As can be clearly seen from FIG. 2, the thin alloy film is deposited to run over and along the irregularities on the current collector surface, and the gaps are formed along lines which extend between respective valleys of the irregularities on the thin alloy film surface and on the current collector surface. It is believed that expansion and shrinkage of the thin alloy film during a charge-discharge reaction has caused formation of such gaps.

As shown in FIGS. 1 and 2, spaces exist to surround the islands of the thin alloy film. These spaces are believed to accommodate changes in volume of the thin alloy film during the charge-discharge reaction and contribute to the improvement of cycle characteristics.

In the above example, the deposition of the thin Sn—Co alloy film on a current collector substrate was achieved by an electrolytic plating process. Alternatively, an electroless plating process may be utilized. Other thin film-forming processes such as sputtering, vacuum deposition and thermal spraying can also be utilized.

EXPERIMENT 3

Analogous to Experiment 1, an electrolytic plating process was utilized to deposit, in the form of a thin film having a thickness of 2 μm, an Sn—Ni, Sn—Fe, Sn—Pb or Sn—Zn alloy onto an 18 μm thick electrolytic copper foil (surface roughness Ra=0.188 μm).

Deposition of the Sn—Ni alloy thin film was effected using an Sn—Ni plating bath containing a mixture of potassium pyrophosphate, tin chloride, nickel chloride and glycine.

Deposition of the Sn—Fe alloy thin film was effected using an Sn—Fe plating bath containing a mixture of tin chloride, iron sulfate, sodium citrate and L-ascorbic acid. The Sn—Fe plating bath was used in different two compositions.

Deposition of the Sn—Pb alloy thin film was effected using an Sn—Pb plating bath containing a mixture of tin borofluoride, lead borofluoride, fluoroboric acid, boric acid and peptone.

Deposition of the Sn—Zn alloy thin film was effected using an Sn—Zn plating bath containing a mixture of organic tin, organic zinc and a complexing agent.

The electrode made via deposition of the Sn—Ni thin film was designated as an electrode c1 of the present invention. The electrodes made via deposition of the Sn—Fe thin films having differing compositions were designated as electrodes c2 and c3 of the present invention, respectively. The electrodes made via deposition of the Sn—Pb and Sn—Zn thin films were designated as comparative electrodes e1 and e2, respectively. Ni and Fe are nonlithium-alloying metals. Sn, Pb and Zn are lithium-alloying metals. Hence, the Sn—Ni alloy thin film and the Sn—Fe alloy thin film fall within the scope of the present invention, but the Sn—Pb alloy thin film and the Sn—Zn alloy thin film falls outside the scope of the present invention.

The compositions of the thin alloy films incorporated in the electrodes c1–c3 of the present invention and comparative electrodes e1 and e2 were analyzed by ICP emission spectrometry. The composition of each thin alloy film is given in Table 3. In Table 3, the composition of the thin alloy film incorporated in the electrode a1 of the present invention in Experiment 1 is also shown.

TABLE 3

| Electrode | Weight Ratio (%) | Atomic Ratio (%) |
|---|---|---|
| Electrode a1 of this Invention (Sn—Co) | 83Sn–17Co | 71Sn–29Co |
| Electrode c1 of this Invention (Sn—Ni) | 81Sn–19Ni | 68Sn–32Ni |
| Electrode c2 of this Invention (Sn—Fe) | 91Sn–9Fe | 83Sn–17Fe |
| Electrode c3 of this Invention (Sn—Fe) | 86Sn–14Fe | 74Sn–26Fe |
| Comparative Electrode e1 (Sn—Pb) | 82Sn–18Pb | 89Sn–11Pb |
| Comparative Electrode e2 (Sn—Zn) | 89Sn–11Zn | 82Sn–18Zn |

Using each of the electrodes c1–c3 of the present invention and the comparative electrodes e1 and e2 as a working electrode, a beaker cell was constructed in the same manner as in Experiment 1, and then evaluated for cycle characteristics. The evaluation results are listed in Table 4.

TABLE 4

| Electrode | 1st-Cycle Charge Capacity (mAh/g) | 1st-Cycle Discharge Capacity (mAh/g) | Initial Efficiency (%) | 10th-Cycle Discharge Capacity (mAh/g) | Capacity Retention Rate (%) |
|---|---|---|---|---|---|
| Electrode c1 of this Invention (Sn—Ni) | 578 | 550 | 95 | 519 | 95 |
| Electrode c2 of this Invention (Sn—Fe) | 626 | 574 | 92 | 427 | 74 |
| Electrode c3 of this Invention (Sn—Fe) | 663 | 593 | 89 | 484 | 82 |
| Comparative Electrode e1 (Sn—Pb) | 704 | 649 | 92 | 156 | 24 |
| Comparative Electrode e2 (Sn—Zn) | 789 | 749 | 95 | 32 | 4 |

As apparent from the results shown in Table 4, the electrodes c1–c3 of the present invention all exhibit the improved cycle characteristics compared to the comparative electrodes e1 and e2.

EXPERIMENT 4

Two electrolytic copper foils (each with a thickness of 18 μm) were used having different surface roughness Ra values. Otherwise, the procedure of Experiment 1 was followed to deposit, in the form of a thin film having a thickness of 2 μm, an Sn—Co alloy on each electrolytic copper foil to thereby fabricate electrodes.

The electrodes fabricated using the electrolytic copper foils having surface roughness Ra values of 0.188 μm and 1.19 μm were designated as electrodes d1 and d2 of the present invention. Likewise, a thin film having a thickness of 2 μm and composed of an Sn—Co alloy was deposited on a rolled copper foil having a surface roughness Ra of 0.04 μm to fabricate an electrode d3 of the present invention. The electrode d1 of the present invention corresponds to the electrode a1 listed in Table 1.

Using each of the electrodes d1 d2 and d3 of the present invention, a beaker cell was constructed in the same manner as in Experiment 1, and then evaluated for charge-discharge cycle characteristics. The evaluation results are listed in Table 5.

TABLE 5

| Electrode | 1st-Cycle Charge Capacity (mAh/g) | 1st-Cycle Discharge Capacity (mAh/g) | Initial Efficiency (%) | 10th-Cycle Discharge Capacity (mAh/g) | Capacity Retention Rate (%) |
|---|---|---|---|---|---|
| Electrode d1 of this Invention (Ra = 0.188) | 772 | 632 | 82 | 628 | 99 |
| Electrode d2 of this Invention (Ra = 1.19) | 788 | 656 | 83 | 620 | 95 |
| Electrode d3 of this Invention (Ra = 0.04) | 780 | 621 | 80 | 425 | 68 |

As can be appreciated from the results shown in Table 5, the surface roughness Ra of the current collector is preferably up to 1 μm, although satisfactory cycle characteristics result even when it exceeds 1 μm. Improved cycle performance relative to the electrode d3 of the present invention is obtained for the electrode d1 of the present invention. These demonstrate that the particularly preferred range of surface roughness Ra of the current collector is 0.1–1 μm.

EXPERIMENT 5

Analogous to Experiment 1, a thin film having a thickness of 2 μm and composed of an Sn—Ni—Co alloy was deposited on an 18 μm thick, electrolytic copper foil (surface roughness Ra=0.188 μm) by an electrolytic plating process.

Deposition of the Sn—Ni—Co alloy thin film was effected using an Sn—Ni—Co plating bath containing a mixture of potassium pyrophosphate, tin chloride, nickel chloride and cobalt chloride.

Using the resulting electrode f1 of the present invention, a beaker cell was constructed in the same manner as in Experiment 1 and then evaluated for charge-discharge cycle characteristics. The evaluation results are given in Table 6. Also, the chemical composition of the film deposited to form the electrode is shown in Table 7.

TABLE 6

| Electrode | 1st-Cycle Charge Capacity (mAh/g) | 1st-Cycle Discharge Capacity (mAh/g) | Initial Efficiency (%) | 10th-Cycle Discharge Capacity (mAh/g) | Capacity Retention Rate (%) |
|---|---|---|---|---|---|
| Electrode f1 of this Invention (Sn—Ni—Co) | 549 | 476 | 87 | 473 | 99 |

TABLE 7

| Electrode | Weight Ratio (%) | Atomic Ratio (%) |
|---|---|---|
| Electrode f1 of this Invention (Sn—Ni—Co) | 72Sn–8Ni–20Co | 56Sn–13Ni–31Co |

As apparent from the results shown in Table 6, the electrode f1 incorporating the Sn—Ni—Co alloy thin film has high charge and discharge capacities and exhibits the improved cycle characteristics relative to the electrode c1 incorporating the Sn—Ni alloy thin film.

UTILITY IN INDUSTRY

In accordance with the present invention, a rechargeable lithium battery can be provided which exhibits a high discharge capacity and improved cycle performance characteristics.

The invention claimed is:

1. A rechargeable lithium battery comprising a positive electrode, a nonaqueous electrolyte and a negative electrode, wherein said negative electrode has a current collector and a thin alloy film provided on the current collector and composed of a metal which alloys with lithium and a metal which does not alloy with lithium, said electrode being characterized in that said current collector has a surface roughness Ra of 0.1 μm–2 μm, said thin alloy film contains 0.1–50% of the metal which does not alloy with lithium based on a molar ratio (atomic ratio), the thin alloy film has a surface with irregularities corresponding to those defined on a surface of the current collector, and the thin alloy film is separated into islands by gaps formed, on the first or subsequent cycle of charge and discharge, along lines extending in a thickness direction of the thin alloy film between valleys of the irregularities on the thin alloy film surface and on the current collector surface.

2. The rechargeable lithium battery as recited in claim 1, characterized in that the metal which alloys with lithium is a metal that forms an intermetallic compound with the metal which does not alloy with lithium.

3. The rechargeable lithium battery as recited in claim 1, characterized in that said thin alloy film is deposited on the current collector by a plating process.

4. The rechargeable lithium battery as recited in claim 1, characterized in that said current collector has a surface roughness Ra of 0.1–1 μm.

5. The rechargeable lithium battery as recited in claim 1, characterized in that said current collector is composed of copper.

6. The rechargeable lithium battery as recited in claim 1, characterized in that said current collector comprises an electrolytic copper foil.

7. The rechargeable lithium battery as recited in claim 1, characterized in that the metal which alloys with lithium is Sn and the metal which does not alloy with lithium is a metal that forms an intermetallic compound with Sn.

8. The rechargeable lithium battery as recited in claim 7, characterized in that the metal which alloys with lithium is Sn and the metal which does not alloy with lithium contains at least one metal selected from Fe, Co and Ni.

9. The rechargeable lithium battery as recited in claim 1, characterized in that the metal which alloys with lithium is Sn, and at least Co is contained as the metal which does not alloy with lithium.

10. The rechargeable lithium battery as recited in claim 9, characterized in that the metal which alloys with lithium is Sn, the metal which does not alloy with lithium is Co, and said thin alloy film comprises an Sn—Co alloy.

11. The rechargeable lithium battery as recited in claim 9, characterized in that the metal which alloys with lithium is Sn, the metal which does not alloy with lithium contains Ni and Co, and said thin alloy film comprises an Sn—Ni—Co alloy.

12. The rechargeable lithium battery as recited in claim 1, characterized in that a mixed layer of components of said current collector and thin alloy film is formed at an interface therebetween.

* * * * *